Oct. 1, 1929.  J. P. NESTOR  1,730,231
EXPANSIBLE REAMER
Filed April 22, 1927
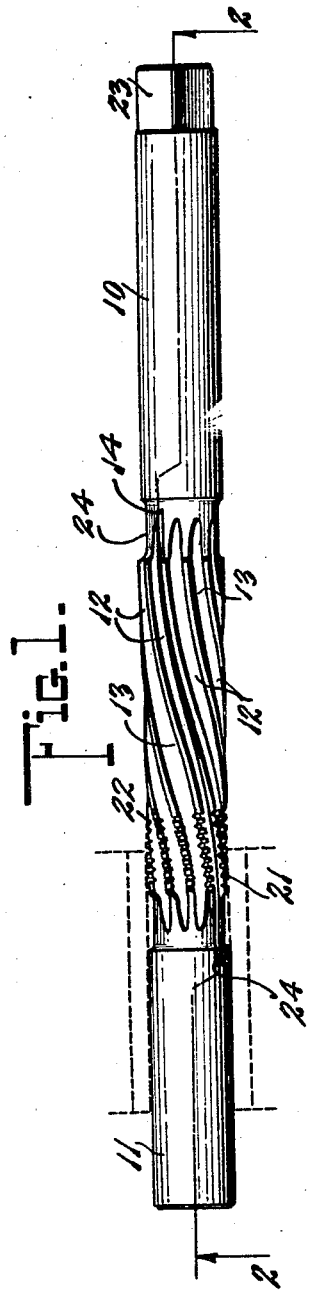
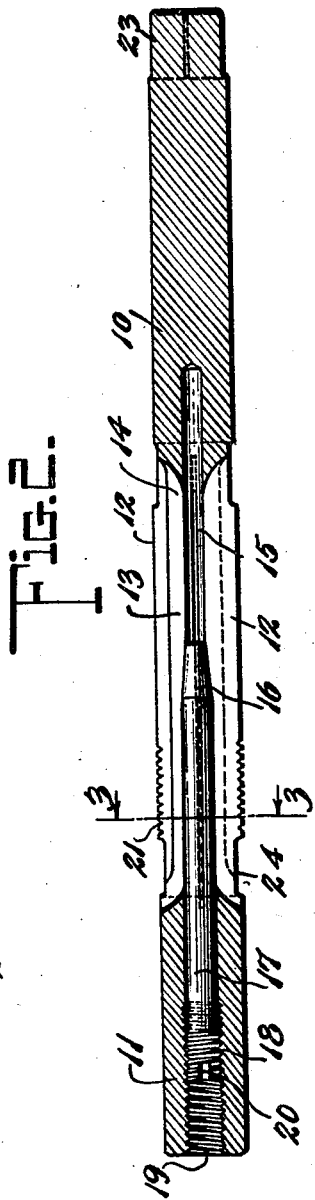
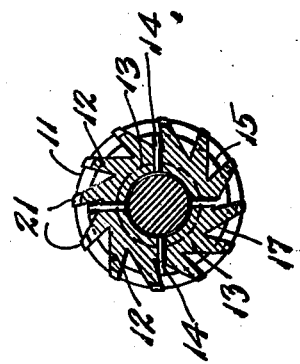
Inventor
J. P. Nestor
By Robert Lobb
Attorney Patented Oct. 1, 1929

1,730,231

UNITED STATES PATENT OFFICE

JOSEPH P. NESTOR, OF LYKENS, PENNSYLVANIA

EXPANSIBLE REAMER

Application filed April 22, 1927. Serial No. 185,788.

This invention relates to an expansible reamer, and particularly to a construction having spirally disposed blades formed on segments separated by longitudinal cuts which permit their expansion by pressure of a core introduced into the reamer.

In this type of reamer it has been found important to provide for a self feeding action thereof particularly when it is necessary to break or penetrate a glazed hard surface of the metal to be reamed. When the spiral blade is brought into engagement with such surface it is frequently seriously dulled and does not properly bite into the same to secure the most efficient action of the reamer. I have therefore found it desirable to provide means upon these blades which tend to break or cut by a tooth-like action into such a hard surface of the metal and thus start the cut which is subsequently finished by the reamer blade in a smooth manner.

In starting this cut it has also been found desirable to effect a feeding action and this result I have accomplished by providing the teeth on the blades in the form of a helical thread so that in their action upon a hard surface they not only break the same and start the cutting but also feed the tool into position to secure the most efficient finishing action by the reamer blade.

In work of this character there is often present in the material to be treated soft stringy metal which tends to clog the flutes or blades of the reamer unless pulverized so as to be removed in the feeding action of the tool, and this result is secured by the provision at the periphery of the spiral blades of the helical threads which being in separated sections cut into the surface of the metal to secure a feeding hold and pulverize or comminute the particles thereof to effect their removal in the continued feed of the tool during which the subsequent reaming action of the blades produces the desired smooth round hole of accurate diameter.

The invention has for an object to provide a novel and improved construction of reamer having spirally disposed blades provided with means for cutting or breaking the surface to be reamed and subsequently finishing such surface.

A further object of the invention is to provide the spiral blades of the reamer with helical feeding threads which by their biting engagement with the object reamed facilitate the introduction of the tool; remove any excess metal, and materially expedite the reaming operation.

Another object of the invention is to provide a tubular expansible reamer formed of separate segments having spiral cutting blades with means within the reamer for expanding said segments and means upon said blades for breaking a surface to be reamed and automatically feeding the reamer upon said surface.

Other objects and advantages of the invention will be hereinafter set forth and the novel features thereof defined by the appended claim.

In the accompanying drawing:

Figure 1 is an elevation of the invention;

Figure 2 is a longitudinal section on the line 2—2 of Figure 1; and

Figure 3 is an enlarged cross section on the line 3—3 of Figure 2.

Like reference characters designate corresponding parts throughout the several figures of the drawing.

The body 10 of the reamer may be of any desired construction and formed by any preferred method. The free end 11 thereof is spaced from the body 10 by the reamer blades 12 which are formed upon segments 13 separated from each other by slots or cuts 14 which extend to a central recess 15 which is tapered to receive an expanding device of any preferred type such as the conical head 16 carried by the rod 17 having the screw head 18 cooperating with the interior thread 19 within the portion 11. By the adjustment of this expander through the introduction of a tool such as a screw driver into contact with the slotted portion 20 of the head 18 the spirally disposed blades will be expanded to increase the diameter of the tool at that point, as is customary in this type of reamer.

The spiral blades 12 are each provided adjacent their outer end, or the portion first engaging the work, with teeth 21 formed by cutting a helical thread as indicated at 22 in Figure 1 upon the separated peripheries of the blades. The result of such a structure is to produce a cutting tooth which breaks into the glazed or hard surface to be reamed and by arranging these teeth in the form of a helical thread a feeding action is secured while the teeth break up into small particles the metal released and cause the same to be fed outward in the space between the spiral blades 12 of the reamer. Any desired number of such blades may be provided dependent upon the size of the reamer and the use for which it is designed.

The body 10 of the reamer may be formed with the usual angular portion 23 to engage a tool socket (not shown) and the reamer blades are separated from the portions 10 and 11 by reduced portions 24 which provide for the discharge of cut material therefrom.

The operation of the reamer will be apparent from the foregoing description from which it will be seen that the initial action of the teeth forming the helical thread is to bite into and comminute the hard surface to be reamed, thus securing a hold for the reamer and feeding it forward while the particles of metal removed will fall between the blades and be fed outwardly thereby.

While the construction of the reamer and the spiral blades thereon has been specifically shown and described, the invention is not confined thereto as changes and alterations may be made in the construction thereof without departing from the spirit of the invention as defined by the appended claim.

Having thus described my invention, what I claim as new and desire to secure by Letters Patent is:—

In an expansible reamer, the combination of spirally disposed cutting blades integrally formed with guiding means at the ends thereof for centering the said reamer, means for breaking the surface to be reamed and feeding the said reamer into an aperture, comprising screw threads helically formed on the entering end of said cutting blades and extending for a relatively short distance in the longitudinal direction of the said blades, means for expanding the said cutting blades comprising a wedge member adapted to engage the interior faces of the cutting blades at a point remote from the threaded portion and substantially midway between the said threaded portion and the opposite end of the said cutting blades, whereby the threaded portion is given a slight taper for feeding the said reamer into an aperture, and means for advancing the said wedge member inwardly to effect an expansion of the reamer as aforesaid.

In testimony whereof I affix my signature.

JOSEPH P. NESTOR.